(12) United States Patent
Balan et al.

(10) Patent No.: US 10,839,253 B2
(45) Date of Patent: Nov. 17, 2020

(54) SYSTEMS AND METHODS FOR OPTIMIZED COMPUTER VISION USING DEEP NEURAL NETWORKS AND LITPSCHITZ ANALYSIS

(71) Applicant: Insurance Services Office, Inc., Jersey City, NJ (US)

(72) Inventors: Radu Balan, Rockville, MD (US); Maneesh Kumar Singh, Lawrenceville, NJ (US); Dongmian Zou, St. Paul, MN (US)

(73) Assignee: Insurance Services Office, Inc., Jersey City, NJ (US)

(*) Notice: Subject to any disclaimer, the term of this patent is extended or adjusted under 35 U.S.C. 154(b) by 0 days.

(21) Appl. No.: 16/443,118

(22) Filed: Jun. 17, 2019

(65) Prior Publication Data

US 2019/0385013 A1 Dec. 19, 2019

Related U.S. Application Data

(60) Provisional application No. 62/685,460, filed on Jun. 15, 2018.

(51) Int. Cl.
*G06K 9/62* (2006.01)
*G06N 3/08* (2006.01)

(52) U.S. Cl.
CPC ............ *G06K 9/6217* (2013.01); *G06N 3/08* (2013.01)

(58) Field of Classification Search
CPC .............................. G06K 9/6217; G06N 3/08
See application file for complete search history.

(56) References Cited

U.S. PATENT DOCUMENTS

| 6,285,992 | B1 | 9/2001 | Kwasny et al. | |
|---|---|---|---|---|
| 6,473,746 | B1* | 10/2002 | Zakrzewski | G06F 11/3608 706/15 |
| 2005/0196065 | A1* | 9/2005 | Balan | G06K 9/00503 382/266 |
| 2010/0030716 | A1* | 2/2010 | Calise | G05B 13/027 706/23 |
| 2015/0045684 | A1* | 2/2015 | Schie | A61B 5/04017 600/523 |

(Continued)

OTHER PUBLICATIONS

P. C. Sofotasios and S. Freear, "Analytic expressions for the Rice le-function and the incomplete Lipschitz-Hankel Integrals," 2011 Annual IEEE India Conference, Hyderabad, 2011, pp. 1-6.doi: 10.1109/INDCON.2011.6139504 (Year: 2011).*

(Continued)

*Primary Examiner* — Santiago Garcia
(74) *Attorney, Agent, or Firm* — McCarter & English, LLP

(57) ABSTRACT

Computer vision systems and methods for optimized computer vision using deep neural networks and Lipschitz analysis are provided. The system receives signals or data related to visual imagery, such as data from a camera, and feed-forwards the signals/data through the multiple layers of a convolutional neural network (CNN). At one or more layers of the CNN, the system determines at least one Bessel bound of that layer. The system then determines a Lipschitz bound based on the one or more Bessel bounds. The system then applies the Lipschitz bound to the signals. Once the Lipschitz bound is applied, the system can feed-forward the signals to other processes of the layer or to a further layer.

20 Claims, 9 Drawing Sheets

(56) References Cited

U.S. PATENT DOCUMENTS

| | | | | |
|---|---|---|---|---|
| 2015/0310862 | A1* | 10/2015 | Dauphin | G10L 15/1815 704/257 |
| 2015/0324655 | A1* | 11/2015 | Chalasani | G06K 9/6272 382/103 |
| 2017/0201198 | A1* | 7/2017 | Wang | H02P 21/14 |
| 2018/0240041 | A1* | 8/2018 | Koch | G06N 3/08 |
| 2018/0357554 | A1* | 12/2018 | Hazan | G06N 7/005 |
| 2019/0304069 | A1* | 10/2019 | Vogels | G06N 3/08 |
| 2019/0304157 | A1* | 10/2019 | Amer | G06N 3/0445 |

OTHER PUBLICATIONS

International Search Report of the International Searching Authority dated Sep. 4, 2019, issued in connection with International Application No. PCT/US19/37469 (3 pages).

Written Opinion of the International Searching Authority dated Sep. 4, 2019, issued in connection with International Application No. PCT/US19/37469 (5 pages).

Bruna, et al. "Invariant Scattering Convolution Networks," IEEE Transactions on Pattern Analysis and Machine Intelligence, vol. 35, No. 8, Aug., 2013, pp. 1872-1886 (15 pages).

Bruna, et al., "A Theoretical Argument for Complex-Valued Convolutional Networks," Mar. 11, 2015, Available at https://www.researchgate.net/publication/273471588 (10 pages).

Hochreiter, et aL, "Long Short-Term Memory," Neural Computation, vol. 9, No. 8 (1997), pp. 1735-1780 (32 pages).

Goodfellow, et al., "Deep Learning," MIT Press, 2015 (802 pages).

Lecun, et aL, "Deep Learning," Nature vol. 521, May 28, 2015, pp. 436-444 (10 pages).

Livni, et aL, "On the Computational Efficiency of Training Neural Networks," Advances in Neural Information Processing Systems 27, Curran Associates, Inc., Oct. 28, 2014, pp. 855-863 Available: <http://papers.nips.cd3aper/5267-on-the-computational-ethciency-of-training-neural-networks.pdf> (15 pages).

Mallat, "Group Invariant Scattering," Communications on Pure and Applied Mathe-matics vol. 65, No. 10 (2012) pp. 1331-1398 Available: <http://dx.doi.org/10.1002/cpa.21413> (68 pages).

Sainath, et aL, "Convolutional, Long Short-Term Memory, Fully Connected Deep Neural Networks," 2015 IEEE International Conference on Acoustics, Speech and Signal Processing, ICASSP 2015, South Brisbane, Queensland, 4ustralia, Apr. 19-24, 2015, pp. 4580-4584 (5 pages).

Szegedy, et al., "Going Deeper With Convolu-tions," 2015 IEEE Conference on Computer Vision and Pattern Recognition (CVPR) (9 pages).

Szegedy, et al., "Intriguing Properties of Neural Networks," Dec. 21, 2013 Available: https://arxiv.org/ 3bs/1312.6199v1 (9 pages).

Wiatowski, et al., "Deep Convolutional Neural Networks Based on Semi-Discrete Frames", Proc. Of IEEE International Symposium on Information Theory (ISIT), Jun. 2015, pp. 1212-1216 Available: https://www.researchgate.net/ Publication/308817254 (6 pages).

Wiatowski, et al., "A Mathematical Theory of Deep Convolutional Neural Networks for Feature Extraction," IEEE Transactions on Information Theory, Dec. 19, 2015, Available: <https://arxiv.org/abs/1512.06293v1> (48 pages).

Krizhevsky, et al., "Imagenet Classification with Deep Convolutional Neural Networks," in Advances in Neural Information Processing Systems, 2012, pp. 1097-1105 (9 pages).

Balan, et al., "Lipschitz Properties for Deep Convolutional Networks," Jan. 18, 2017, Available: <http://arxiv.org/abs/1701.05217> (25 pages).

Xanthopoulos, et al., "Linear Discriminant Analysis." New York, NY: Springer New York, 2013, pp. 27-33 (7 pages).

LeCun, et al., "MNIST Handwritten Digit Database," (2010) Available: <http://yann.lecun.com/exdb/mnisti> (8 pages).

Vedaldi, et al., "Matconvnet - Convolutional Neural Networks for Matlab," in Proceeding of the ACM Int. Conf. On Multimedia, Jun. 21, 2015 (35 pages).

Zou, et al."On Lipschitz Bounds of General Convolutional Neural Networks" Aug. 4, 2018, Available <https://arxiv.org/abs/1808.01415> (26 pages).

Ledoux, et al, "Probability in Banach Spaces," Springer-Verlag, 1991, pp. 1-214 (part 1 of 2).

Ledoux, et al, "Probability in Banach Spaces," Springer-Verlag, 1991, pp. 215-443 (part 2 of 2).

Ledoux, "The Concentration of Measure Phenomenon," American Mathematical Society, vol. 89 (2005) (193 pages).

\* cited by examiner

SYSTEMS AND METHODS FOR OPTIMIZED COMPUTER VISION USING DEEP NEURAL NETWORKS AND LITPSCHITZ ANALYSIS

RELATED APPLICATIONS

The present application claims the priority of U.S. Provisional Application Ser. No. 62/685,460 filed on Jun. 15, 2018, the entire disclosure of which is expressly incorporated by reference.

BACKGROUND

Technical Field

The present disclosure relates generally to the field of computer vision technology. More specifically, the present disclosure relates to computer vision systems and methods for optimized computer vision using deep neural networks and Lipschitz analysis.

Related Art

Convolutional neural network ("CNNs") are widely used in machine learning and are an effective tool in various image processing tasks, such as classification of objects. In particular, CNNs can be used as feature extractors to extract different details from images to identify objects in the images. As a feature extractor, CNNs are stable with respect to small variations in the input data, and therefore, perform well in a variety of classification, detection and segmentation problems. As such, similar features are expected when inputs are from the same class.

The stability to deformation of certain CNNs can be attributed to sets of filters that form semi-discrete frames which have an upper bound equal to one. This deformation stability is a consequence of the Lipschitz property of the CNN or of the feature extractor. As such, the upper bound can be referred to as a Lipschitz bound.

However, current CNNs can be fooled by changing a small number of pixels, thus leading to an incorrect classification. This can be the result of an instability of the CNN due to a large Lipschitz bound or a lack of one. Therefore, there is a need for computer vision systems and methods which can determine the Lipschitz bound for different types of CNNs, thereby improving the ability of computer vision systems to tolerate variations in input data. These and other needs are addressed by the computer vision systems and methods of the present disclosure.

SUMMARY

The present disclosure relates to computer vision systems and methods for optimized computer vision using deep neural networks and Lipschitz analysis. A neural network, such as a CNN, is a multiple layer network with learnable weights and biases that can be used for, among other things, analyzing visual imagery. The system of the present disclosure receives signals or data related to the visual imagery, such as data from a camera, and feed-forwards the signals/data through the multiple layers of the CNN. At one or more layers of the CNN, the system determines at least one Bessel bound of that layer. The system then determines a Lipschitz bound based on the one or more Bessel bounds. The system then applies the Lipschitz bound to the signals. Once the Lipschitz bound is applied, the system can feed-forward the signals to other processes of the layer or to a further layer.

BRIEF DESCRIPTION OF THE DRAWINGS

The foregoing features of the invention will be apparent from the following Detailed Description of the Invention, taken in connection with the accompanying drawings, in which.

DETAILED DESCRIPTION

The present disclosure relates to computer vision systems and methods for optimized computer vision using deep neural networks and Lipschitz analysis as described in detail below in connection with FIGS. 1-8.

By way of background and before describing the systems and methods of the present disclose in detail, the structure and properties of convolutional neural networks ("CNNs") will be discussed first. It should be noted that the CNNs discussed below relate to a generic CNN. However, those skilled in the art would understand that the method and exemplary embodiments in this disclosure can pertain to any CNN, including but not limited to, scattering CNNs, fully connected CNNs, sparsely connected CNNs, etc.

Figure 1:
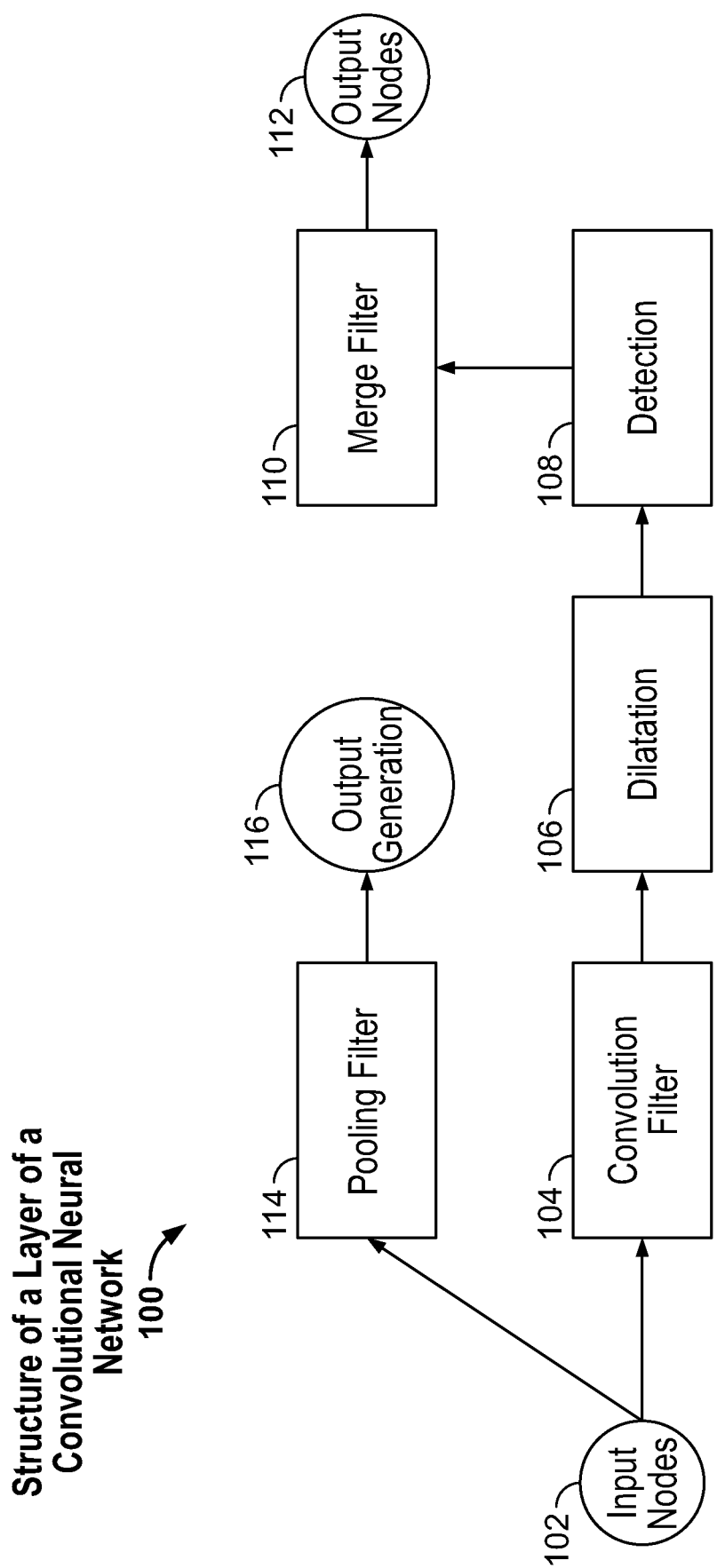
FIG. 1 is a block diagram illustrating a structure of a layer of a convolution neural network.

A CNN can contain multiple layers, where each layer can consist of different or similar features. FIG. 1 illustrates a layer 100 of a CNN. The layer 100 of FIG. 1 includes an input node 102, a convolution filter 104, a dilation operation 106, a detection operation 108, a merge filter 110, an output node 112, a pooling filter 114 and output generation 116. It should be understood that although the nodes, filters and the operations will be discussed in the singular context, any layer of the CNN can contain any number of nodes, filters and operations.

The input node 102 can process one or more signal(s) and/or data, such as image data (e.g., pixels) or audio data. The input node 102 can be derived from an output node of a previous layer of the CNN or, when a layer of the CNN is a first layer, the input node 102 can be an initial input or signal. For example, a camera can be positioned to record traffic patterns in a particular area. The data from the camera can be fed into the CNN, where each image can be converted into an input node 102 that is fed into a first layer of the CNN. The first layer can then apply its filters and operations to the input signal of the input node 102 and produce an output node 112, which can then be fed into a second layer of the CNN.

The convolution filter 104 is a filter that can apply a convolution operation to the signal from the input node 102. For example, the operation can apply one or more convolution filters to different sections of the input signal. The result of the operation produces an output signal that is fed-forward to a next filter or process in the next layer of the CNN, or the result can be transformed into an output node. It should be noted that the input signal can be described with the symbol ("y") and the convolution filter 104 can be described with the symbol ("g") throughout the figures and description of the present disclosure.

The dilation operation 106 is an operation that can dilate an element of the output signal and/or data by a predetermined factor. For example, if the signal and/or data is represented in a 3×3 matrix, the dilation operation can dilate the 3×3 matrix into a 7×7 matrix. It should be noted that the dilation operation 106 can be described with the symbol ("↓D") throughout the figures and description of the present disclosure.

The detection operation 108 is a nonlinear operation(s) that is applied pointwise to the output signal from the convolution filter 104. For example, the nonlinear operation can be a Lipschitz constant, a rectified linear unit ("ReLU"), a sigmoid, etc. The application of the nonlinear operation can improve the robustness of the CNN by preventing instability. Specifically, the nonlinear operation can prevent a value(s) from the input signals from uncontrollably increasing and becoming unmanageable when the values are processed through, for example, the merge filter 110 and the pooling filter 114. It should be noted that the detection operation 108 can be described with the symbol ("σ").

To optimize the performance of computer vision systems which rely on CNNs, the present disclosure determines an optimal Lipschitz bound for the CNN. This determination can occur during the detection operation 108. By determining the optimal Lipschitz bound, they can be a significant reduction in identification errors, which would enable the CNN to conduct a more accurate analysis. Thus, the methods and embodiments discussed herein produce a significant improvement in the functioning of computer vision systems. Processes for determining the optimal Lipschitz bound are discussed in more detail below.

Figure 2:
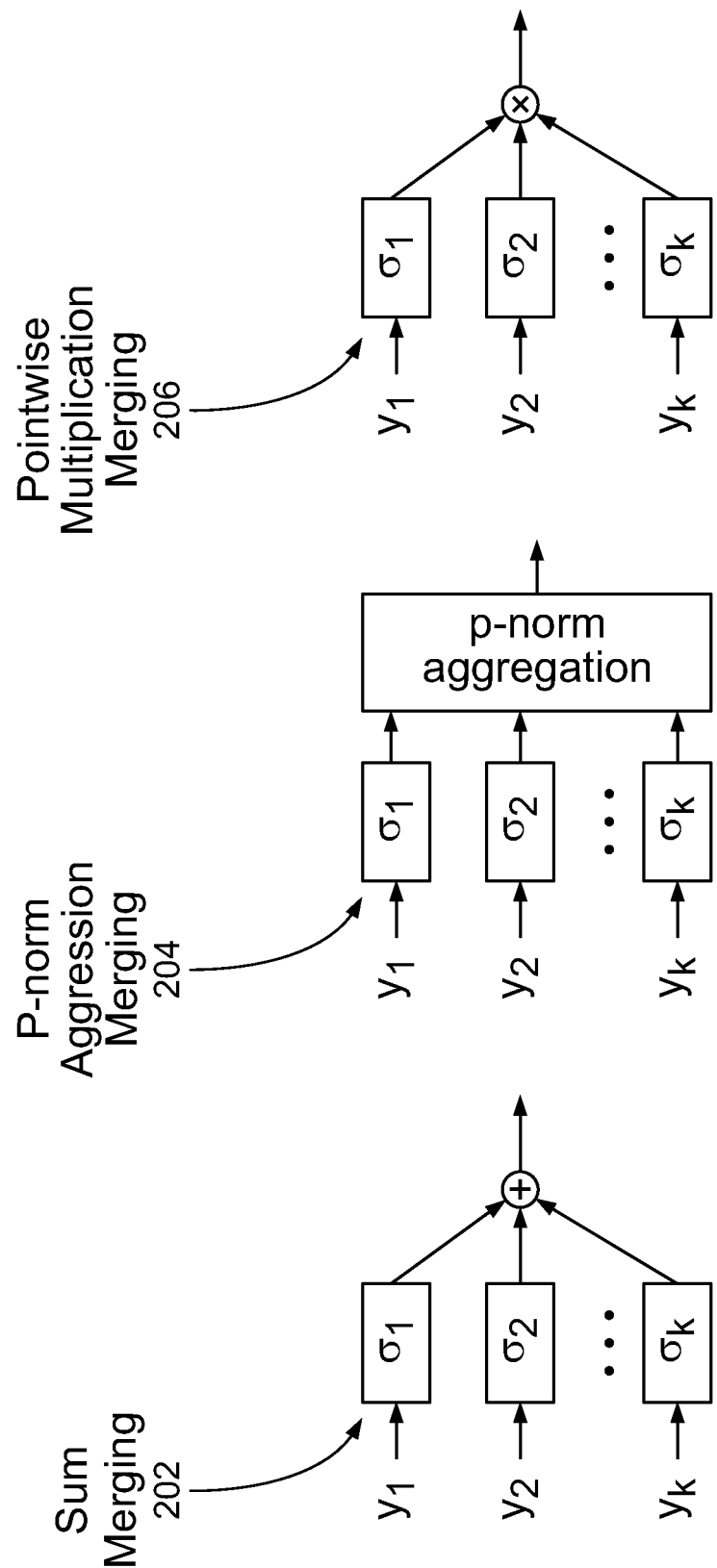
FIG. 2 is a block diagram illustrating three types of merging operations of the present disclosure.

The merge filter 110 is a filter that merges two or more outputs from the detection operation 108 by a pointwise operation to produce a single output. FIG. 2 shows three examples of possible merging operations. The first example is sum merging 202, which can, for example, take input signals $y_1$, $y_2$, $y_k$ from a filter (e.g., the convolution filter), apply a nonlinearity function $\sigma_1$, $\sigma_2$, $\sigma_k$, respectively (e.g., a Lipschitz bound), and produce a sum. The output of the sum merging 202 can be defined by the following formula, where k is a total number of inputs:

$$z = \sum_{j=1}^{k} \sigma_j(y_j)$$

The second example is p-norm aggregation 204, which can, for example, take input signals $y_1$, $y_2$, $y_k$ from a filter, apply a nonlinearity function $\sigma_1$, $\sigma_2$, $\sigma_k$, respectively, and apply a pointwise p-norm aggregation. The output of the p-norm aggregation 204 can be defined by the formula:

$$z = \left( \sum_{i=1}^{k} |\sigma_2(y_j)|^p \right)^{1/p}$$

The third example is pointwise multiplication merging 206, which can, for example, take input signals $y_1$, $y_2$, $y_k$ from a filter, apply a nonlinearity function $\sigma_1$, $\sigma_2$, $\sigma_k$, respectively, and apply a pointwise multiplication. The output of the pointwise multiplication merging 206 can be defined by the formula:

$$z = \prod_{j=1}^{k} \sigma_j(y_j)$$

It should be noted that the merge filter 110 of FIG. 1 can be described with the symbol ("⊕") for sum merging 202 and with the symbol ("⊗") for pointwise multiplication merging 206 throughout the figures and description of the present disclosure. It should further be noted that the output value "z" can be used to determine the Lipschitz bound.

Figure 3:
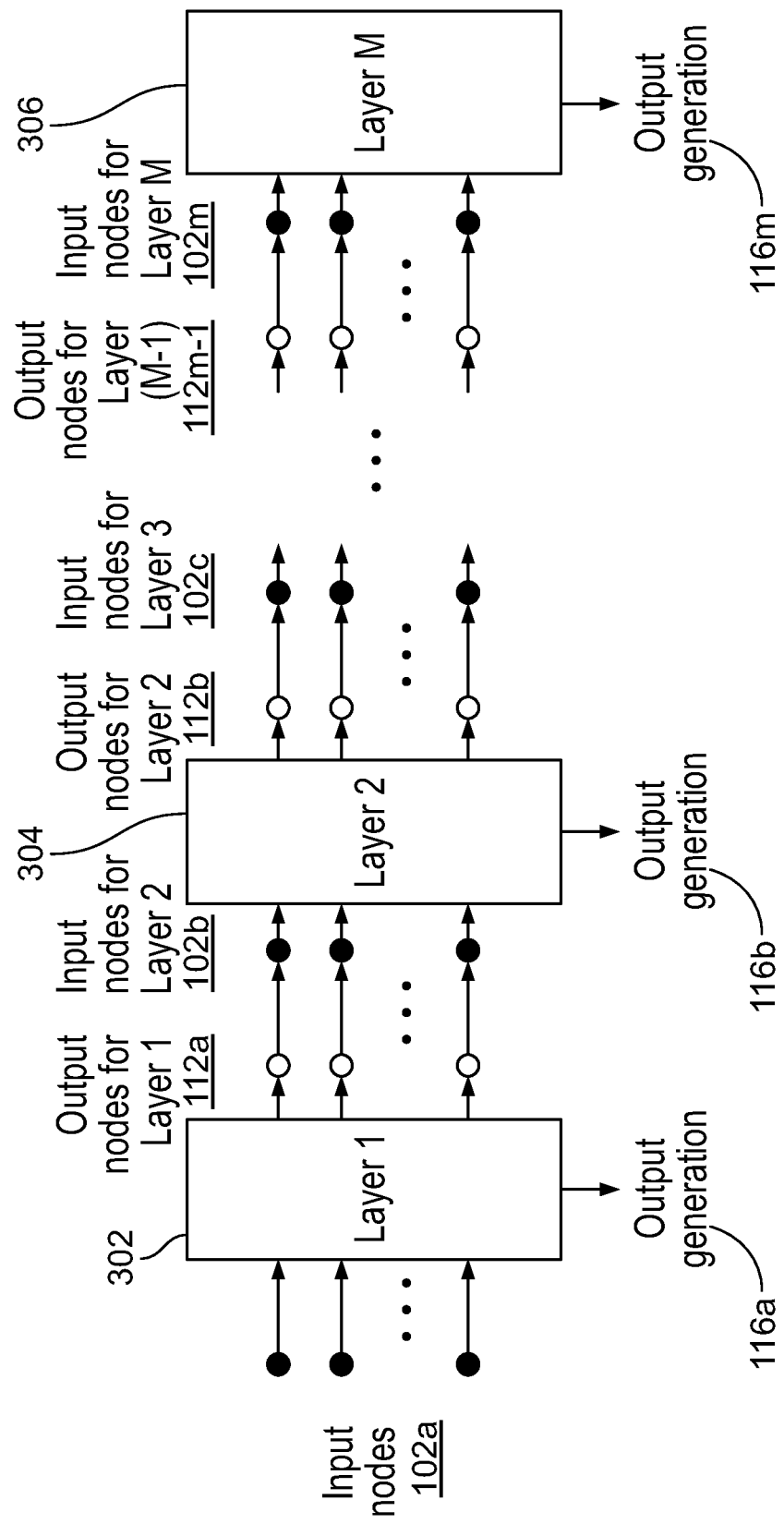
FIG. 3 is a block diagram illustrating a multiple layer convolutional neural network.

The output node 112 of FIG. 1 can be a node that includes one or more output signals produced in a layer of the CNN. As noted above, the output node 112 can transition into an input node for a further layer. For example, as seen in FIG. 3, input node 102a can feed another layer 302. Within the layer 302, one or more filters and/or operations can be applied to the input signals of the input nodes 102a to generate output signals. The output signals can exit the layer 302 as output nodes 112a, and/or are generated by output generation process 116a. The output nodes 112a can enter layer 304 as input nodes 102b and the input signals from input nodes 102b can be subjected to one or more filters and/or operations. It should be understood by those skilled in the art that the layer 302 and the layer 304 can contain the same or different filters and/or operations. The above described functions can repeat until layer M 306 is reached.

Figure 4A:
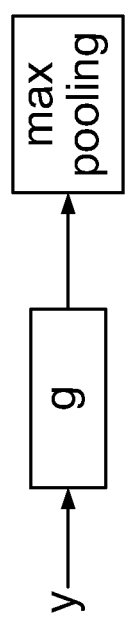
FIGS. 4A-4B are block diagrams illustrating a pooling filter.
Figure 4A:
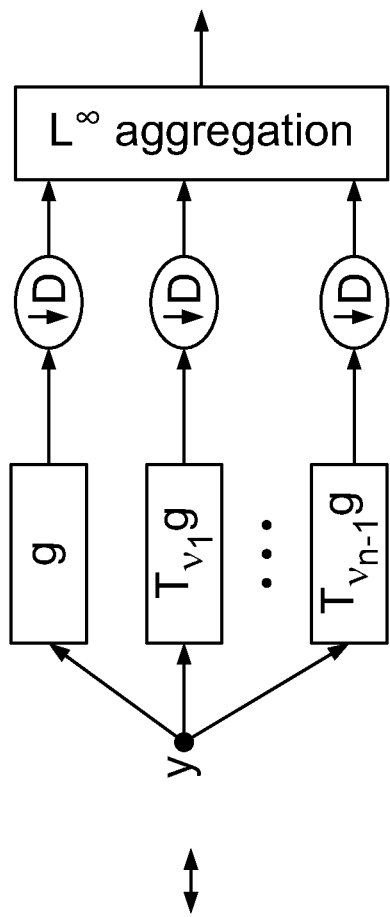

Returning to FIG. 1, the pooling filter 114 is a filter that can lower the dimensionality or bandwidth of the input signals for output generation 116. A first example of the pooling filter 114 is "max" pooling, which is shown in FIG. 4A. Max pooling is an operation that includes taking the maximal element among the elements in a sub-region. Translation and dilation can be used to separate elements in a sub-region to distinct channels and an $L^\infty$ aggregation process selects the largest element.

Figure 4B:
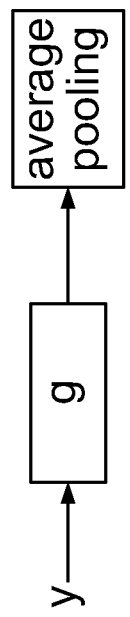
Figure 4B:
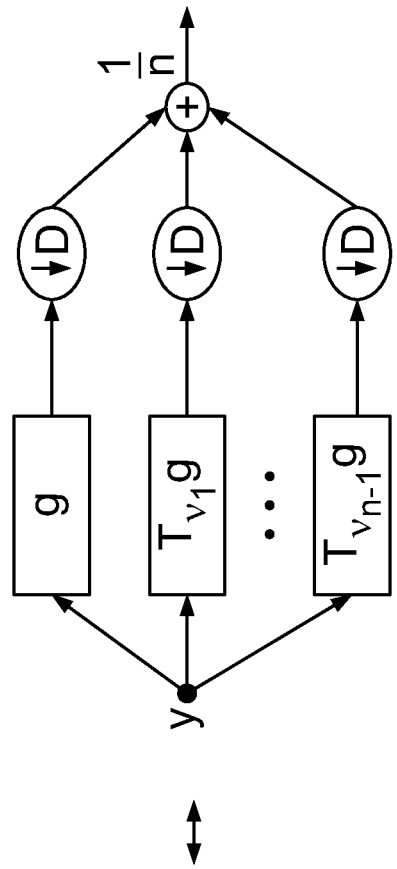

A second example of the pooling filter 114 is average pooling, which is shown in FIG. 4B. Average pooling is an operation of determining an average value among the elements in a sub-region. The values of three elements are combined and divided by the number of elements to determine an average pooling value.

Figure 5A:
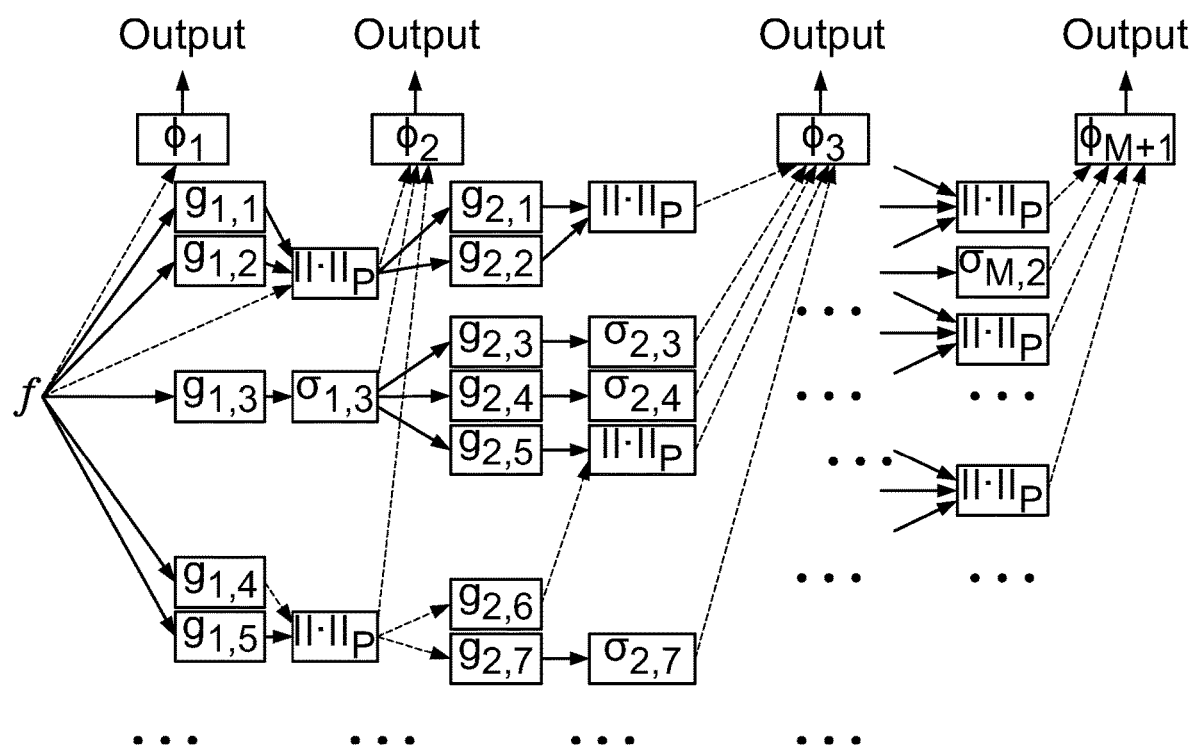
FIGS. 5A-5B are block diagrams illustrating a multiple layer convolutional neural network.
Figure 5B:
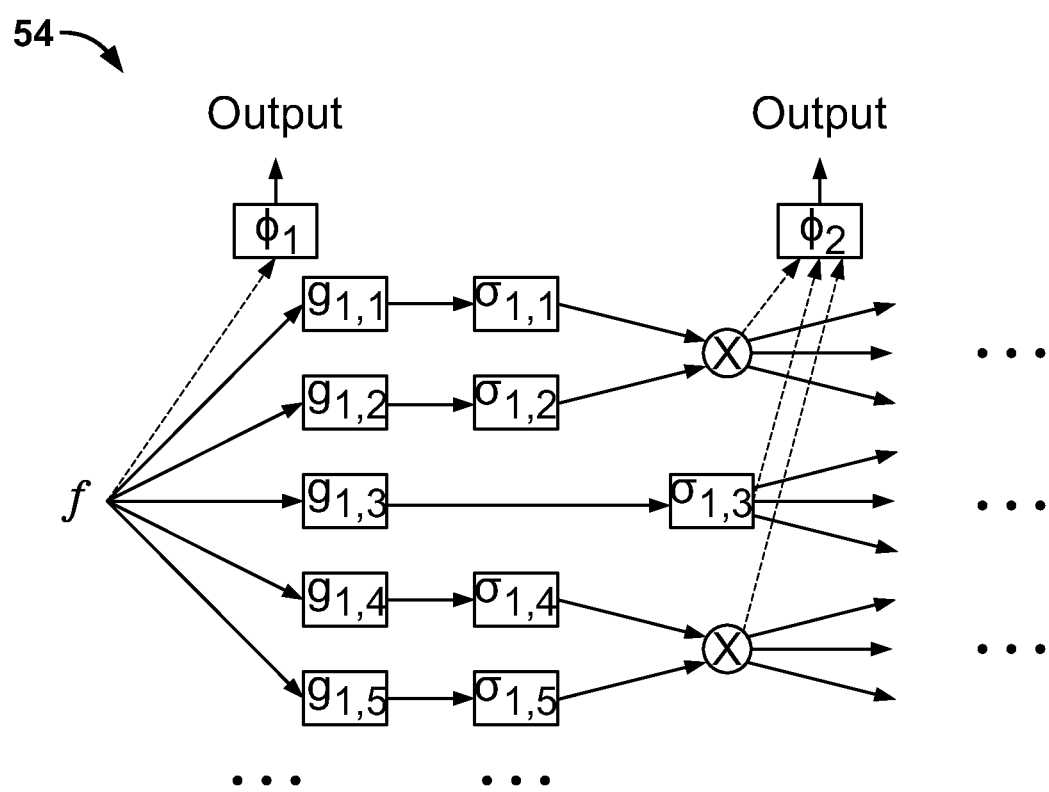

It should be understood that the structure of the layer in FIG. 1 is only exemplary. Those skilled in the art would understand that any combination of the filters and operations discussed in FIG. 1 can be included in any layer of the CNN and the filters and operations can be in different positions along the flow of the layer. For example, FIGS. 5A and 5B are different layers within a scattering CNN. In particular, FIG. 5A shows a scattering CNN 52 with pointwise p-norms. FIG. 5B shows a scattering CNN 54 with multiplication. It should be understood that a scattering CNN is only one type of CNN and, as discussed above, other CNNs can be used (e.g., fully connected CNNs, sparsely connected CNNs, etc.)

It should further be noted that the merging operations of the merge filter 110 and the pooling operations of the pooling filter 114 aggregate input signals from the input nodes 102 filters and/or signals. As noted discussed above, a nonlinear operation, such as an operation which imposes a Lipschitz bound, can prevent the values from the input signals from uncontrollably increasing and becoming unmanageable when the values are processed through the merge filter 110 and the pooling filter 114. Additionally, a Lipschitz bound can be imposed on a signal, after which the signal can proceed to a next layer.

Figure 6:
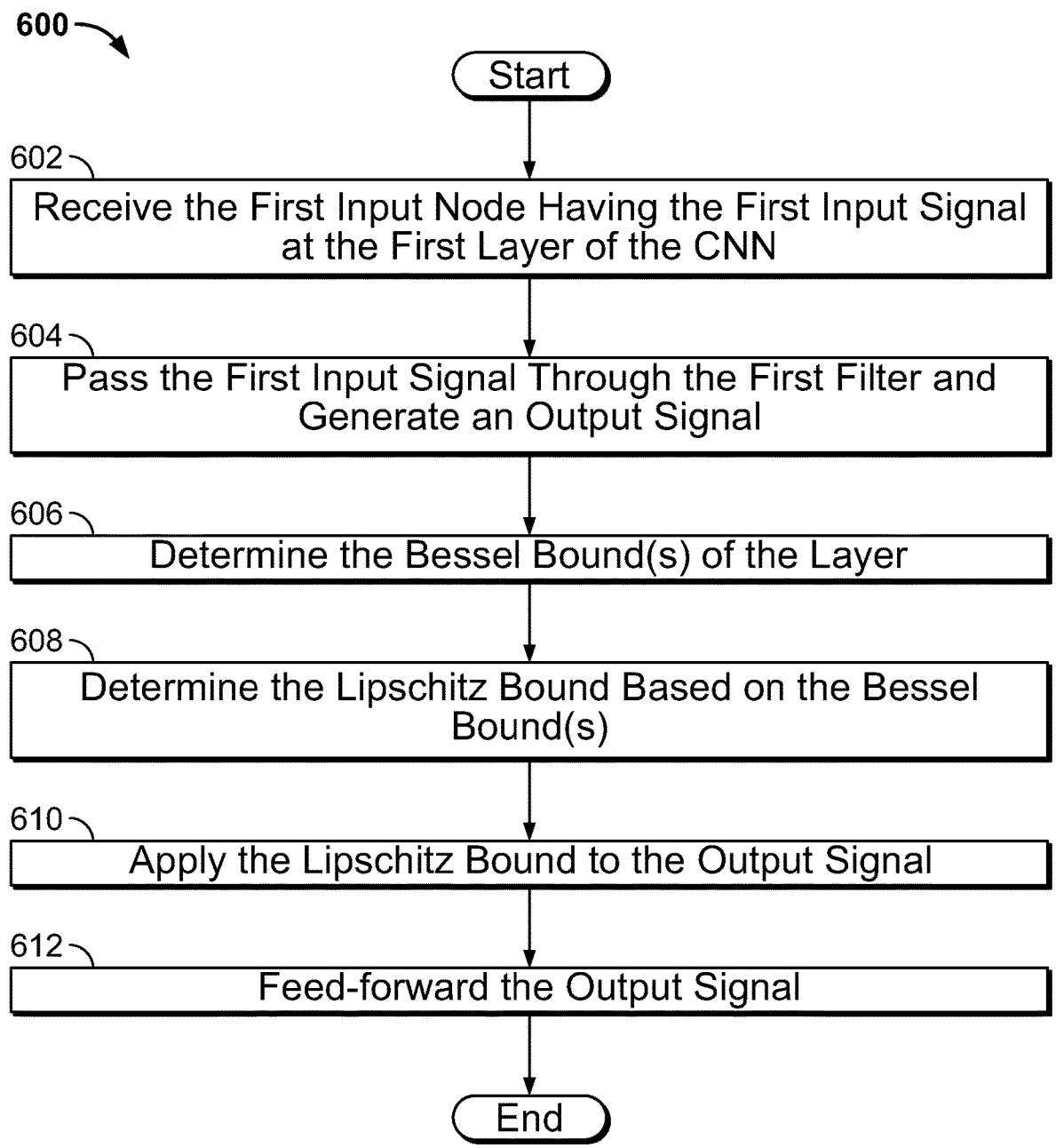
FIG. 6 is a flowchart illustrating processing steps carried out by the computer vision system of the present disclosure.

FIG. 6 is a flowchart illustrating processing steps 600, according to the present disclosure, for determining an optimal Lipschitz bound of a layer in the CNN. As noted above, by determining the optimal Lipschitz bounds for the CNN, the system of the present disclosure greatly improves the functionality of computer vision systems.

In step 602, a first layer of the CNN receives a first input node. The first input node includes a first input signal. For example, the input signal can be a matrix representative of an image. In step 604, the input signal can pass through a first filter. The first filter can be the convolution filter 104. The convolution filter 104 applies the convolution operation to the input signal. The result of the operation produces an output signal that is fed-forward to the detection operation 108.

In step 606, the detection operation 108 receives the output signal and determine at least one type of Bessel bound for the first layer. Two set of formulas for determining the different types of Bessel bounds will be discussed. The first set of Bessel bound formulas, seen below, can be used to determine three types of Bessel bounds if the first layer does not contain the merge filter 110:

$$B_m^{(1)} = \sup_{\omega \in \mathbb{R}^d} \left\| \begin{bmatrix} \Delta^{(m)} \tilde{T}^{(m)}(\omega) \\ \tilde{\Phi}^{(m)}(\omega) \end{bmatrix} \right\|_{op}^2$$

$$B_m^{(2)} = \sup_{\omega \in \mathbb{R}^d} \left\| [\Delta^{(m)} \tilde{T}^{(m)}(\omega)] \right\|_{op}^2$$

$$B_m^{(3)} = \sup_{\omega \in \mathbb{R}^d} \left\| [\tilde{\Phi}^{(m)}(\omega)] \right\|_{op}^2$$

where:
- $B_m^{(1)} = 1^{st}$ type of Bessel bound for an m-th layer with no merge filter;
- $B_m^{(2)} = 2^{nd}$ type of Bessel bound an for m-th layer with no merge filter;
- $B_m^{(3)} = 3^{rd}$ type of Bessel bound an for m-th layer with no merge filter;

for each $\omega$, $\tilde{T}^{(m)}(\omega)$ stands for $n^B_m$-by-$n_m$ matrix that contains the Fourier transform $\hat{T}_{n^B,n}^{(m)}$ of $T_{m,n}^{(m)}\omega$; for $1 \leq n \leq n_m$, $1 \leq n^B \leq n^B_m$, $\hat{\Phi}^{(m)}(\omega)$ stands for the $n^B_m$-by-$n_m$ diagonal matrix that has the Fourier transform at $\hat{\phi}_{m,n}$ of $\hat{\phi}_{m,n}$ at $\omega$ for its (n, n) entry; and $\Delta^m$ is the $n^B_m$-by-$n^B_m$ diagonal matrix with $(\det D_{m,n}^B)^{-1/2}$ as its $(n^B, n^B)$ entry.

The second set of Bessel bound formulas, seen below, can be used to determine three types of Bessel bounds if the first layer contains the merge filter 110.

$$B_m^{(1)} = \max_{1 \leq n \leq n_m} B_{m,n}^{(1)}$$

$$B_m^{(2)} = \max_{1 \leq n \leq n_m} B_{m,n}^{(2)}$$

$$B_m^{(3)} = \max_{1 \leq n \leq n_m} B_{m,n}^{(3)}$$

where:
- $B_m^{(1)} = 1^{st}$ type of Bessel bound for an m-th layer with a merge filter;
- $B_m^{(2)} = 2^{nd}$ type of Bessel bound an for m-th layer with a merge filter;
- $B_m^{(3)} = 3^{rd}$ type of Bessel bound an for m-th layer with a merge filter;

It should be understood by those skilled in the art that the amount and type of Bessel bounds determined in 606, as well as the formulas for determining each type of Bessel bound, can be different depending on the filters and operations in a layer (e.g., the first layer). Thus, the two sets of formulas used in this disclosure to determine three types of Bessel bounds based on whether the first layer contains the merge filter 110 is only exemplary.

In step 608, the detection operation 108 can determine the Lipschitz bound for the first layer. The Lipschitz bound can be determined based on the type of the Bessel bound(s) determined in step 606. Bessel bounds $B_m^{(1)}$, $B_m^{(2)}$, and $B_m^{(3)}$ can be determined in step 606 and, in step 608, the Lipschitz bound can be determined by the following first Lipschitz calculation:

$$\max \sum_{m=1}^{M} z_m$$

s.t. $y_0 = 1$ $y_m + z_m \leq B_m^{(1)} y_{m-1}$, $1 \leq m \leq M - 1$ $y_m + B_m^{(2)} y_{m-1}$, $1 \leq m \leq M - 1$ $y_m + B_m^{(3)} y_{m-1}$, $1 \leq m \leq M - 1$ $y_m, z_m \geq 0$, for all $m$ As discussed above, the value "z" relates to the output value of the merge operation used by the merge filter 110.

The Lipschitz bound can also be determined in step 608 by the following second Lipschitz calculation using only Bessel bound $B_m^{(1)}$.

$$\prod_{m=1}^{M} \max\{1, B_m^{(1)}\}.$$

Additionally, the Lipschitz bound can also be determined in step 608 by the following third Lipschitz calculation using only $B_m^{(2)}$ and $B_m^{(3)}$.

$$B_1^{(3)} + \sum_{m=2}^{M} B_m^{(3)} \prod_{m^3=1}^{m-1} B_m^{(2)}$$

In step 610, the determined Lipschitz bound is applied to the output signal. It should be understood that in step 608, the first Lipschitz calculation, the second Lipschitz calculation and the third Lipschitz calculation can produce different Lipschitz bound values. As such, in step 610, the Lipschitz bound value that is closest to optimality can be selected. Alternatively, a different Lipschitz bound value can be selected based on a predetermined parameter. In step 612, the output signal is fed-forward to the next process or filter in the first layer or to a next layer. For a first example, the output signal can be fed-forward to a merge filter 110 or a pooling filter 114. Alternatively, the output signal can be fed-forward to a next layer of the CNN.

Figure 7:
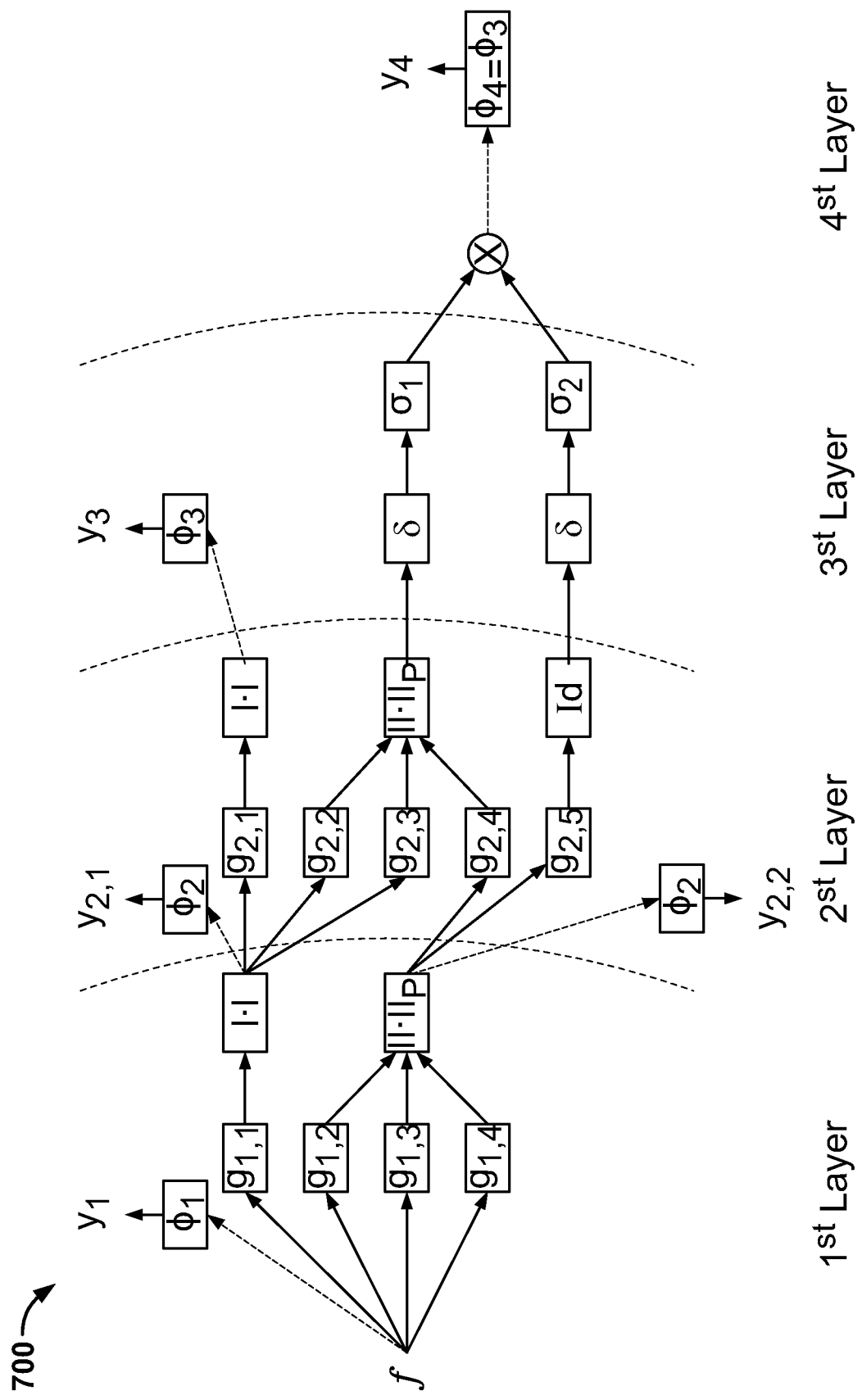
FIG. 7 is a diagram illustrating a convolutional neural network with multiple layers, in accordance with the present disclosure.

FIG. 7 illustrates a CNN with multiple (four) layers 700. Using the steps described in FIG. 6, the following Fourier formula will produce the Bessel bounds shown below in Table 1.

The function on the Fourier domain supported on (−1,1) is defined as:

$$F(\omega) = \exp\left(\frac{4\omega^2 + 4\omega + 1}{4\omega^2 + 4\omega}\right)\chi_{(-1,-1/2)}(\omega) +$$

$$\chi_{(-1/2,1/2)}(\omega) + \exp\left(\frac{4\omega^2 - 4\omega + 1}{4\omega^2 - 4\omega}\right)\chi_{(1/2,1)}(\omega).$$

The Fourier transforms of the filters to be $C^\infty$ gate function are defined as:

$$\hat{\phi}_1(\omega) = F(\omega)$$

$$\hat{g}_{1,j}(\omega) = F(\omega + 2j - 1/2) + F(\omega - 2j + 1/2)$$

$$j = 1, 2, 3, 4.$$

$$\hat{\phi}_2(\omega) = \exp\left(\frac{4\omega^2 + 12\omega + 9}{4\omega^2 + 12\omega + 8}\right)\chi_{(-2,-3/2)}(\omega) +$$

$$\chi_{(-3/2,3/2)}(\omega) + \exp\left(\frac{4\omega^2 - 12\omega + 9}{4\omega^2 - 12\omega + 8}\right)\chi_{(3/2,2)}(\omega)$$

$$\hat{g}_{2,j}(\omega) = F(\omega + 2j) + F(\omega - 2j)$$

$$j = 1, 2, 3.$$

$$\hat{g}_{2,4}(\omega) = F(\omega + 2) + F(\omega - 2)$$

$$\hat{g}_{2,5}(\omega) = F(\omega + 5) + F(\omega - 5)$$

$$\hat{\phi}_3(\omega) = \exp\left(\frac{4\omega^2 + 20\omega + 25}{4\omega^2 + 20\omega + 24}\right)\chi_{(-3,-5/2)}(\omega) +$$

$$\chi_{(-5/2,5/2)}(\omega) + \exp\left(\frac{4\omega^2 - 20\omega + 25}{4\omega^2 - 20\omega + 25}\right)\chi_{(5/2,3)}(\omega).$$

TABLE 1

| | m | | | |
|---|---|---|---|---|
| | 1 | 2 | 3 | 4 |
| $B_m^{(1)}$ | $2e^{-1/3}$ | $2e^{-1/3}$ | 2 | 1 |
| $B_m^{(1)}$ | 1 | 1 | 2 | 0 |
| $B_m^{(1)}$ | 1 | 1 | 1 | 1 |

Applying the first Lipschitz calculation to the determined Bessel bounds in Table 1 produces a Lipschitz bound of 2.866. Applying the second Lipschitz calculation to the determined Bessel bounds in Table 1 produces a Lipschitz bound of 4.102. Applying the third Lipschitz calculation to the determined Bessel bounds in Table 1 produces a Lipschitz bound of 5. As such, the Lipschitz bound value of 2.866, as determined by the first Lipschitz calculation, is the closest to optimality. Thus, for example, the Lipschitz bound value of 2.866 can be selected in step 610 of FIG. 6 and applied to the output signal.

Figure 8:
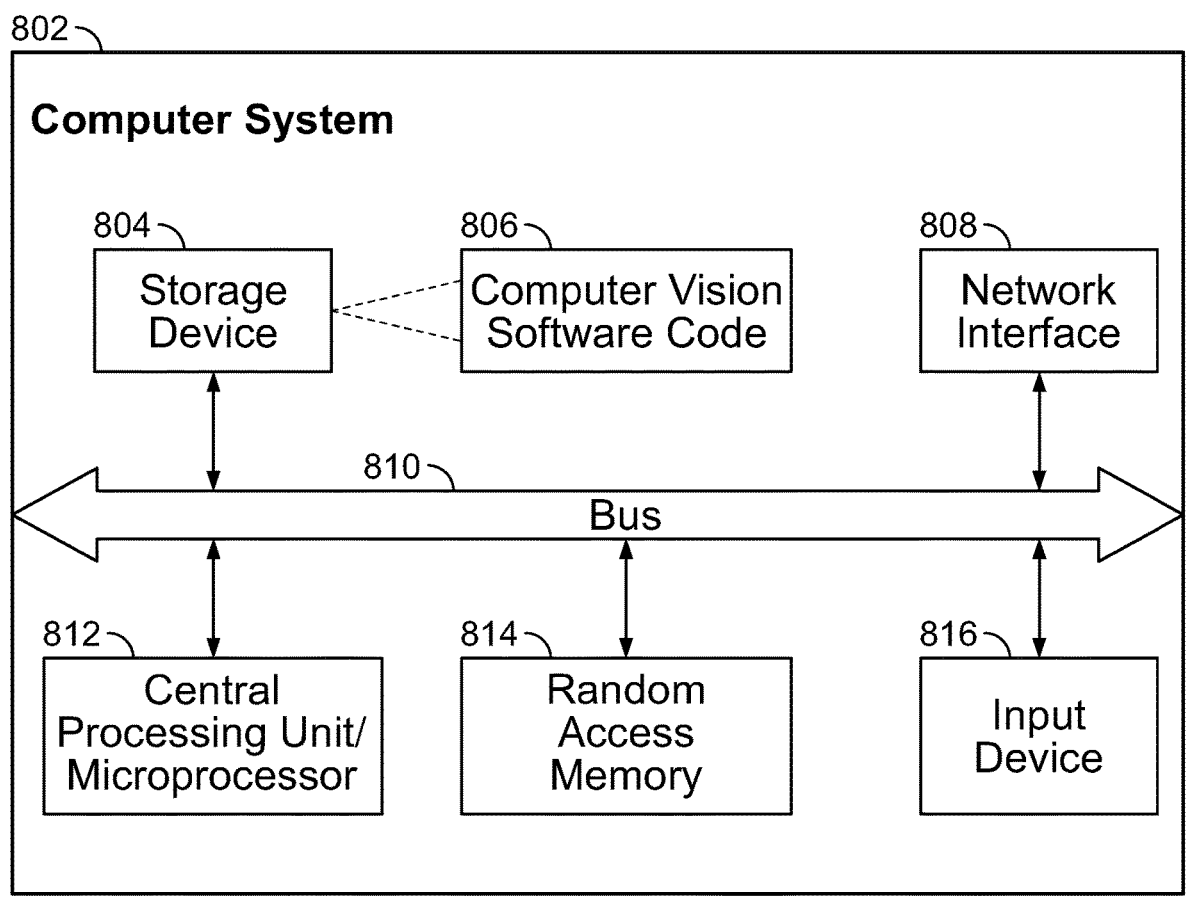
FIG. 8 is a diagram illustrating hardware and software component capable of implementing the system of the present disclosure.

FIG. 8 is a diagram showing a hardware and software components of a computer system 802 on which the system of the present disclosure can be implemented. The computer system 802 can include a storage device 804, computer vision software code 806, a network interface 808, a communications bus 810, a central processing unit (CPU) (microprocessor) 812, a random access memory (RAM) 814, and one or more input devices 816, such as a keyboard, mouse, etc. The server 802 could also include a display (e.g., liquid crystal display (LCD), cathode ray tube (CRT), etc.). The storage device 804 could comprise any suitable, computer-readable storage medium such as disk, non-volatile memory (e.g., read-only memory (ROM), eraseable programmable ROM (EPROM), electrically-eraseable programmable ROM (EEPROM), flash memory, field-programmable gate array (FPGA), etc.). The computer system 802 could be a networked computer system, a personal computer, a server, a smart phone, tablet computer etc. It is noted that the server 802 need not be a networked server, and indeed, could be a stand-alone computer system.

The functionality provided by the present disclosure could be provided by computer vision software code 806, which could be embodied as computer-readable program code stored on the storage device 804 and executed by the CPU 812 using any suitable, high or low level computing language, such as Python, Java, C, C++, C #, .NET, MATLAB, etc. The network interface 808 could include an Ethernet network interface device, a wireless network interface device, or any other suitable device which permits the server 802 to communicate via the network. The CPU 812 could include any suitable single-core or multiple-core microprocessor of any suitable architecture that is capable of implementing and running the computer vision software code 806 (e.g., Intel processor). The random access memory 814 could include any suitable, high-speed, random access memory typical of most modern computers, such as dynamic RAM (DRAM), etc.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is intended to be protected by Letters Patent is set forth in the following claims.

What is claimed is:

1. A computer vision system, comprising:
   at least one computer system; and
   computer vision system code executed by the at least one computer system, the computer vision system code causing the computer system to:
   receive, at a first layer of a convolution neural network executing on the computer system, a first input node wherein the first input node comprises a first input signal;
   generate a first output signal by passing the first input signal through a first filter;
   determine at least one first Bessel bound for the first layer;
   determine a first Lipschitz bound based on the at least one first Bessel bound; and
   apply the first Lipschitz bound to the first output signal.

2. The computer vision system of claim 1, wherein the computer vision system code further causes the computer system to:

transform the first output signal into an output node;

feed-forward the output node to a second layer of the convolution neural network, wherein the output node becomes a second input node, the second input node comprising a second input signal;

generate a second output signal by passing the second input signal through a second filter;

determine at least one second Bessel bound for the second layer;

determine a second Lipschitz bound based on the at least one first Bessel bound and the at least one second Bessel bound; and apply the second Lipschitz bound to the output signal.

3. The computer vision system of claim 1, wherein the first filter can be one of a convolution filter, a merge filter or a pooling filter.

4. The computer vision system of claim 1, wherein the at least one first Bessel bound is determined based on whether the first layer comprises a merge filter.

5. The computer vision system of claim 1, wherein the at least one first Bessel bound comprises three Bessel bounds.

6. The computer vision system of claim 5, wherein each of the three Bessel bounds are determined by a different formula.

7. The computer vision system of claim 6, wherein the first Lipschitz bound is determined by using a value from at least one of the three Bessel bounds.

8. A method, comprising:

receiving, at a first layer of a convolution neural network executing on a computer system, a first input node wherein the first input node comprises a first input signal;

generating a first output signal by passing the first input signal through a first filter;

determining at least one first Bessel bound for the first layer;

determining a first Lipschitz bound based on the at least one first Bessel bound; and applying the first Lipschitz bound to the first output signal.

9. The method of claim 8, further comprising:

transforming the first output signal into an output node;

feed-forwarding the output node to a second layer of the convolution neural network, wherein the output node becomes a second input node, the second input node comprising a second input signal;

generating a second output signal by passing the second input signal through a second filter;

determining at least one second Bessel bound for the second layer;

determining a second Lipschitz bound based on the at least one first Bessel bound and the at least one second Bessel bound; and applying the second Lipschitz bound to the output signal.

10. The method of claim 8, wherein the first filter can be one of a convolution filter, a merge filter or a pooling filter.

11. The method of claim 8, wherein the at least one first Bessel bound is determined based on whether the first layer comprises a merge filter.

12. The method of claim 8, wherein the at least one first Bessel bound comprises three Bessel bounds.

13. The method of claim 12, wherein each of the three Bessel bounds are determined by a different formula.

14. The method of claim 13, wherein the first Lipschitz bound is determined by using a value from at least one of the three Bessel bounds.

15. A non-transitory, computer-readable medium having computer readable instructions stored thereon which, when executed by a processor, cause the processor to perform the steps comprising, receiving, at a first layer of a convolution neural network, a first input node wherein the first input node comprises a first input signal;

generating a first output signal by passing the first input signal through a first filter;

determining at least one first Bessel bound for the first layer;

determining a first Lipschitz bound based on the at least one first Bessel bound; and applying the first Lipschitz bound to the first output signal.

16. The computer-readable medium of claim 15, further comprising computer-readable instructions for causing the processor to perform the steps of:

transforming the first output signal into an output node;

feed-forward the output node to a second layer of the convolution neural network, wherein the output node becomes a second input node, the second input node comprising a second input signal;

generating a second output signal by passing the second input signal through a second filter;

determining at least one second Bessel bound for the second layer;

determining a second Lipschitz bound based on the at least one first Bessel bound and the at least one second Bessel bound; and applying the second Lipschitz bound to the output signal.

17. The computer-readable medium of claim 15, wherein the first filter can be one of a convolution filter, a merge filter or a pooling filter.

18. The computer-readable medium of claim 15, wherein the at least one first Bessel bound is determined based on whether the first layer comprises a merge filter.

19. The computer-readable medium of claim 15, wherein:

the at least one first Bessel bound comprises three Bessel bounds; and each of the three Bessel bounds are determined by a different formula.

20. The computer-readable medium of claim 19, wherein the first Lipschitz bound is determined by using a value from at least one of the three Bessel bounds.

* * * * *

UNITED STATES PATENT AND TRADEMARK OFFICE
CERTIFICATE OF CORRECTION

| | | |
|---|---|---|
| PATENT NO. | : 10,839,253 B2 | Page 1 of 1 |
| APPLICATION NO. | : 16/443118 | |
| DATED | : November 17, 2020 | |
| INVENTOR(S) | : Balan et al. | |

It is certified that error appears in the above-identified patent and that said Letters Patent is hereby corrected as shown below:

On the Title Page

In the Title and in the Specification, Column 1, Line 3, the word "LITPSCHITZ" should be deleted and replaced with the word "LIPTSCHTIZ"

Signed and Sealed this
Eleventh Day of October, 2022

Katherine Kelly Vidal
*Director of the United States Patent and Trademark Office*